US012662286B2

(12) United States Patent
Brown

(10) Patent No.: US 12,662,286 B2
(45) Date of Patent: Jun. 23, 2026

(54) FOLDING STORAGE CONTAINER

(71) Applicant: Serve Craft, LLC, Roebuck, SC (US)

(72) Inventor: Joseph A. Brown, Roebuck, SC (US)

(73) Assignee: Serve Craft, LLC, Roebuck, SC (US)

( * ) Notice: Subject to any disclaimer, the term of this patent is extended or adjusted under 35 U.S.C. 154(b) by 0 days.

(21) Appl. No.: 17/891,361

(22) Filed: Aug. 19, 2022

(65) Prior Publication Data

US 2023/0054621 A1 Feb. 23, 2023

Related U.S. Application Data

(60) Provisional application No. 63/235,233, filed on Aug. 20, 2021.

(51) Int. Cl.

| | |
|---|---|
| ***B65D 5/66*** | (2006.01) |
| ***B31B 50/26*** | (2017.01) |
| ***B31B 100/00*** | (2017.01) |
| ***B31B 120/10*** | (2017.01) |
| ***B65D 5/20*** | (2006.01) |

(52) U.S. Cl.

CPC .......... *B65D 5/6655* (2013.01); *B31B 50/262* (2017.08); *B65D 5/2057* (2013.01); *B31B 2100/00* (2017.08); *B31B 2120/102* (2017.08)

(58) Field of Classification Search

CPC ...... B65D 5/2038; B65D 5/2047; B65D 5/26; B65D 5/30–308; B65D 5/6626; B65D 5/665; B65D 5/6655; B65D 5/6658

USPC ................................ 229/141, 149, 154, 106

See application file for complete search history.

(56) References Cited

U.S. PATENT DOCUMENTS

| | | | | | |
|---|---|---|---|---|---|
| 267,624 | A * | 11/1882 | Westervelt | B65D 3/08 | 229/126 |
| 493,779 | A * | 3/1893 | Meech | B65D 5/008 | 229/116 |
| 1,992,098 | A * | 2/1935 | Sidway | B65D 5/302 | 229/120 |
| 2,789,750 | A * | 4/1957 | Kramer | B65D 5/26 | 229/196 |
| 3,343,660 | A * | 9/1967 | Bailey | B65D 5/6608 | 229/162.1 |
| 3,481,525 | A * | 12/1969 | Pierce, Jr. | B65D 5/26 | 229/194 |
| 5,148,972 | A | 9/1992 | Clayton | | |

(Continued)

FOREIGN PATENT DOCUMENTS

| | | | |
|---|---|---|---|
| BR | 202016008612 | U2 * | 10/2017 |
| EP | 0489606 | A1 | 6/1992 |

(Continued)

OTHER PUBLICATIONS

Green Paper Products, Biodegradable Food Boxes for Carry-Out, May 27, 2021 https://greenpaperproducts.com/compostable-biodegradable-paper-takeout-box-01BPTRAIIM.aspx?var=50&ik=4215&ds_rl=1290751&ds_rl=1290751&gclid=EAlalQobChMlqdW7-q3q8AIV321vBB02bQI.

*Primary Examiner* — Nathan J Newhouse
(74) *Attorney, Agent, or Firm* — Douglas L. Lineberry

(57) ABSTRACT

Described herein are folding storage containers and methods for making and assembling same that may be assembled and disassembled to provide for convenient storage and handling of various materials including foodstuffs, products, gifts, tools, kits, etc., wherein the folding storage container may include surface enhancements to render it versatile to holding a wide variety of components, as well as to provide for biocompatibility/biodegradability.

17 Claims, 17 Drawing Sheets

(56) References Cited

U.S. PATENT DOCUMENTS

| | | | | |
|---|---|---|---|---|
| 5,411,204 | A | 5/1995 | DeMay | |
| 5,427,308 | A | 6/1995 | Swift et al. | |
| 6,702,179 | B2 * | 3/2004 | Chang | B65D 5/26 229/128 |
| 9,540,132 | B1 * | 1/2017 | Lee | B65D 5/4266 |
| 2004/0074801 | A1 | 4/2004 | Ritter et al. | |
| 2004/0178252 | A1 | 9/2004 | Stone et al. | |
| 2007/0051785 | A1 | 3/2007 | Roessiger | |
| 2008/0093430 | A1 * | 4/2008 | Wethington | B65D 5/241 229/150 |
| 2011/0120902 | A1 | 5/2011 | Boswell et al. | |
| 2014/0263600 | A1 | 9/2014 | Valencia | |
| 2016/0244924 | A1 | 8/2016 | Schneider | |
| 2017/0197750 | A1 | 7/2017 | Wolf et al. | |
| 2017/0240340 | A1 | 8/2017 | Sawyers | |
| 2018/0334308 | A1 | 11/2018 | Moore et al. | |
| 2021/0053720 | A1 | 2/2021 | Page | |
| 2021/0147108 | A1 * | 5/2021 | Oliveira | B65D 5/2047 |

FOREIGN PATENT DOCUMENTS

| | | | | | |
|---|---|---|---|---|---|
| GB | 444233 | A | * | 3/1936 | |
| GB | 1140735 | A | * | 1/1969 | B65D 5/302 |
| GB | 1271398 | A | * | 4/1972 | |
| KR | 200447690 | Y1 | * | 2/2010 | |
| KR | 20110007420 | U | * | 7/2011 | |
| WO | WO2005051780 | | | 6/2005 | |
| WO | WO2010140897 | | | 12/2010 | |
| WO | WO2016087846 | | | 6/2016 | |
| WO | WO2018095981 | | | 5/2018 | |
| WO | WO2020061569 | | | 3/2020 | |

* cited by examiner

FOLDING STORAGE CONTAINER

TECHNICAL FIELD

The subject matter disclosed herein is generally directed to a folding storage container, and methods for making and assembling same, that may be assembled and disassembled to provide for convenient storage and handling of various materials including foodstuffs, products, gifts, tools, kits, etc., wherein the folding storage container may include surface enhancements to render it versatile to holding a wide variety of components, as well as to provide for biocompatibility/biodegradability.

BACKGROUND

Product containers, such as those for holding foodstuffs, products, materials, etc., provide handy means for storing and carrying items. For instance, U.S. Pat. No. 5,427,308, Swift, et al., provides a container with integral handles and locking tabs. As the '308 patent explains, the containers have a container carrying body (30) and a removable lid (29) portion, both formed of thin light weight sheet material, and including a combined latching (13) and handle (9) system carried by the container carrying body (30). The handles (9) and locking tabs (13) are integrally attached to the carrying body (30). The lid (29) includes an opening through which the handle (9) can pass, and slots which can be engaged by the locking tabs (13) to secure the lid (29) to the container body (30). The tabs (13) are placed into locking position when the handles (9) are lifted into the carrying position through the lid (29). The handles (9), locking tabs (13), and container body (30) may be stamped from a single piece of thin light weight sheet material, thereby simplifying its construction and adding to the economy of the container. In one modification, the configuration of the carrying handles (9) allows a slotted liner (27) to be slipped over the handles (9), before the lid (29) is attached. Where the liner (27) is waterproof this renders the interior of the carrying body (30), and thus the container, waterproof, from the inside and so suitable as a cooler or for carrying liquids. As a substitute to a liner (27), coatings or films may be applied to the inside or outside surfaces of the container body (30) to make the container waterproof, increase its durability, enhance its thermal insulation qualities, or to provide other needed characteristics. See FIG. 1.

FIG. 2 shows EP0489606A1, Hudek et al., that provides a prior construct that may be assembled from a cut and scored blank. US Pat. Pub. 2021/0053720, Page, see FIG. 3, provides a blank for a container for a food product, the blank comprising a substantially rectangular base having four edges, and four side walls extending from each edge of said base; and a lid which is joined to one said side wall by a hinged fold to dose the container in use; wherein each side wall has a top edge and a bottom edge which is joined to the base by a hinged fold; and wherein at least one said side wall is trapezoidal.

WO2020061569, Epstein et al., see FIG. 4, provides blanks for forming clamshell containers. The clamshell containers include a tray and a lid that are hingedly connected together. The tray is liquid tight, and typically includes gussets on each corner to prevent leakage. The lid and tray can be locked via at least one locking mechanism, optionally two different locking mechanisms. A first locking mechanism involves a front panel on the tray, with an extension portion that terminates in a hook or tab. The extension portion can fold over the front panel of the lid, and the hook or tabs slide into a slit(s) on the top of the lid. An optional second locking mechanism involves lid detents and tray detents. In some embodiments, in the locked position, the lid detents are underneath the tray detents and the tray detents retain the lid detents in place until a force is applied.

US Pat. Pub. No. 2016/0244924, Schneider, provides a foldable collecting utensil, which comprises two interconnected sub-compartments which are closable to enclose a collected material. The utensil is collapsible to a flat storing state and may be transferred into an operable enclosing state by pulling lateral tabs, pairs of intersecting folding lines define the allowable folding operations for changing the state of the utensil. See FIG. 5.

U.S. Pat. No. 5,411,204, Demay, see FIG. 6, shows a reclosable food tray generally comprising a receptacle portion and first and second pair of opposing closure flaps. The receptacle portion has a substantially trapezoidal volume defined by a rectangular shaped bottom panel and two substantially upstanding pair of opposing side panels. The two pair of opposing side panels define four pair of adjacent panels which are hingedly connected in a liquid-sealed manner by a folded gusset secured to the exterior surface of one of the adjacent side panels by adhesive. Each side panel is disposed at an obtuse angle measured from the bottom panel to facilitate stacking of the receptacle portion of successive trays. The first pair of opposing closure flaps extend from one pair of opposing side panels and are capable of closing off a portion of the access opening. The second pair of opposing closure flaps extend from the other pair of opposing side panels and are adapted to interlock with each other, overlap a portion of the first pair of opposing closure flaps, and close off the remaining portion of the access opening.

US Pat. Pub. No. 2017/0197750, Wolf et al., see FIG. 7, shows a container blank comprising a bottom portion defined on four sides by a first, second, third, and fourth bottom score, a first side portion partially defined by the first bottom score, a second side portion partially defined by the second bottom score, a front portion partially defined by the third bottom score, a back portion defined by the fourth bottom score, a first back connecting portion connecting the first side portion to the back portion, a second back connecting portion connecting the second side portion to the back portion, a first front connecting portion connecting the first side portion to the front portion, and a second front connecting portion connecting the second side portion to the front portion. Folding the side portions about their respective bottom scores causes the back and front portions to fold about their respective bottom scores.

US Pat. Pub. No. 2014/0263600, Valencia, see FIG. 8, shows reclosable and stackable food trays formed from a single blank that are capable of being folded and glued on standard machinery. Embodiments of the invention include raised gussets that extend beyond the top edge of the side panels of the formed tray and beyond the top of the formed tray. In some embodiments, the raised gussets help prevent distortion in all dimensions and facilitate the stacking of multiple trays on top of one another such that the stacked trays cannot slide off the lower tray.

US Pat. Pub. No. 2004/0178252, Stone et al., FIG. 8 shows a container with a simple opening and closure mechanism which provides for easy reclosure of the container. A user may grasp a reclosable flap and move the flap between open and closed positions to effect opening and closure of the container. The reclosable flap may overlay a container lid such that the container lid is kept in a closed position when the reclosable flap overlays the container lid with the reclosable flap in its closed position. The container may be open and closed several times, and a seal may be maintained in the vicinity of the reclosable flap even after multiple uses of the container.

Given the numerous attempts in the field, accordingly, it is an object of the present disclosure to provide a simplified container construct that is more durable than existing constructs to securely encapsulate products, whether foodstuffs, products, etc., wherein the container is aesthetically pleasing, reusable, and may be formed to contain a wide host of goods.

Citation or identification of any document in this application is not an admission that such a document is available as prior art to the present disclosure.

SUMMARY

The above objectives may be accomplished according to the present disclosure by providing in one embodiment a folding storage container. The folding storage container may include a blank configured to fold into at least one storage container, the blank may include a blank inner surface defining a blank bottom connected to a blank front panel, a blank first side panel, a blank second side panel, and a blank back panel via at least one bottom hinge disposed between the blank bottom, the blank front panel, the blank first side panel, the blank second side panel, and the blank back panel, wherein the at least one bottom hinge is configured to allow each of the blank front panel, the blank first side panel, the blank second side panel, and the blank back panel to hingedly pivot with respect to the blank bottom, a blank lid connected to the blank back panel via a blank lid hinge configured to allow the blank lid to hingedly pivot with respect to the blank back panel, the blank lid further comprising a blank closure tab extending from the blank lid, the blank front panel further comprising at least one front panel side flange, the at least one front panel side flange further defining at least one front panel insertion point and at least one front panel tab, the blank back panel further comprising at least one back panel side flange, the at least one back panel side flange defining at least one back panel insertion point and at least one back panel tab, the at least one front panel insertion point configured to engage the at least one back panel tab and the at least one back panel insertion point configured to engage the at least one front panel tab. Further, the at least one bottom hinge may be a score line or a preformed bend. Yet still, the blank front panel may define at least one lid closure tab slot to engage the blank closure tab. Again, the blank lid may define at least one lid side tab insert. Still yet, the blank first side panel or the blank second side panel may define at least one lid slide tab slot configured to engage the at least one lid side tab insert. Moreover, the blank closure tab, the at least one back panel insertion point, or the at least one front panel insertion point may comprise a slot. Further again, the slot comprising the blank closure tab, the slot comprising the at least one back panel insertion point, or the slot comprising the at least one front panel insertion point may be angled with respect to the blank bottom.

In a further embodiment, a method for forming a folding storage container is provided. The method may include lifting a front panel and bending the front panel with respect to a blank bottom via bending at least one first hinge positioned between the front panel and the blank bottom, bending a blank first side and a blank second side, via bending at least one first hinge affixed to the blank first side and at least one second hinge affixed to the blank second side, to bend the blank first side and the blank second side upward with respect to the blank bottom; sliding at least one first front panel insertion point under the blank first side and sliding at least one second front panel insertion point under the blank second side, inserting the at least one first front insertion point into a side panel first receiving slot and inserting the at least one second front panel insertion point into a side panel second receiving slot, introducing at least one front panel tab, formed on the front panel, into at least one front panel tab receiving slot, formed on the back panel, bending a back panel along its adjacent blank bottom hinge and moving the back panel upward with respect to the blank bottom, sliding at least one first back panel insertion point under a blank first side and sliding at least one second back panel insertion point under a blank second side and then inserting the at least one first back panel insertion point into a first insertion point receiving slot and the at least one second back panel insertion point into a second insertion point receiving slot, affixing at least one first back panel tab into a first side panel second receiving slot and affixing at least one second back panel tab into a second side panel second receiving slot to form a container cavity, securing the blank lid via bending the blank lid along a lid hinge to place the blank lid essentially parallel to the blank bottom and inserting a blank closure tab into a lid closure tab slot to secure the blank lid to the front panel, inserting at least one first lid side tab, formed on the blank lid, into at least one first lid slide tab slot, formed into the blank first side, and inserting at least one second lid side tab, formed on the blank lid, into the at least one second lid slide tab slot, formed into the blank second side, to secure the blank lid to the blank first side and the blank second side. Further, the at least one first hinge and the at least one second hinge may be configured to comprise a score line or a preformed bend. Still yet, the blank lid may be configured to define at least one lid side tab insert. Moreover, the lid closure tab slot, the side panel first receiving slot, the side panel second receiving slot, the first insertion point receiving slot, and the second insertion point receiving slot may be configured so their respective slots lay at an angle with respect to the blank bottom.

In a further embodiment, the disclosure provides, a method for making a folding storage container comprising. The method may include forming a blank configured to fold into at least one storage container, the blank may include a blank inner surface defining at least, a blank bottom connected to a blank front panel, a blank first side panel, a blank second side panel, and a blank back panel via at least one bottom hinge disposed between the blank bottom, the blank front panel, the blank first side panel, the blank second side panel, and the blank back panel, wherein the at least one bottom hinge is configured to allow each of the blank front panel, the blank first side panel, the blank second side panel, and the blank back panel to hingedly pivot with respect to the blank bottom, a blank lid connected to the blank back panel via a blank lid hinge configured to allow the blank lid to hingedly pivot with respect to the blank back panel; the blank lid further comprising a blank closure tab extending from the blank lid; the blank front panel further comprising at least one front panel side flange, the at least one front panel side flange further defining at least one front panel insertion point and at least one front panel tab; the blank back panel further comprising at least one back panel side flange, the at least one back panel side flange defining at least one back panel insertion point and at least one back panel tab; the at least one front panel insertion point configured to engage the at least one back panel tab and the at least one back panel insertion point configured to engage the at least one front panel tab. Further, the at least one bottom hinge may be configured to comprise a score line or a preformed bend. Still yet, the blank front panel may be configured to define at least one lid closure tab slot configured to engage the blank closure tab. Moreover, the blank lid may be configured to define at least one lid side tab insert. Further yet, the blank first side panel or the blank second side panel may be configured to define at least one lid slide tab slot configured to engage the at least one lid side tab insert. Further still, the at least one blank panel insertion point, the at least one back panel insertion point, or the at least one front panel insertion point comprises a slot. Again yet, the slot comprising the blank closure tab, the slot comprising the at least one back panel insertion point, or the slot comprising the at least one front panel insertion point may be configured to be angled with respect to the blank bottom.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
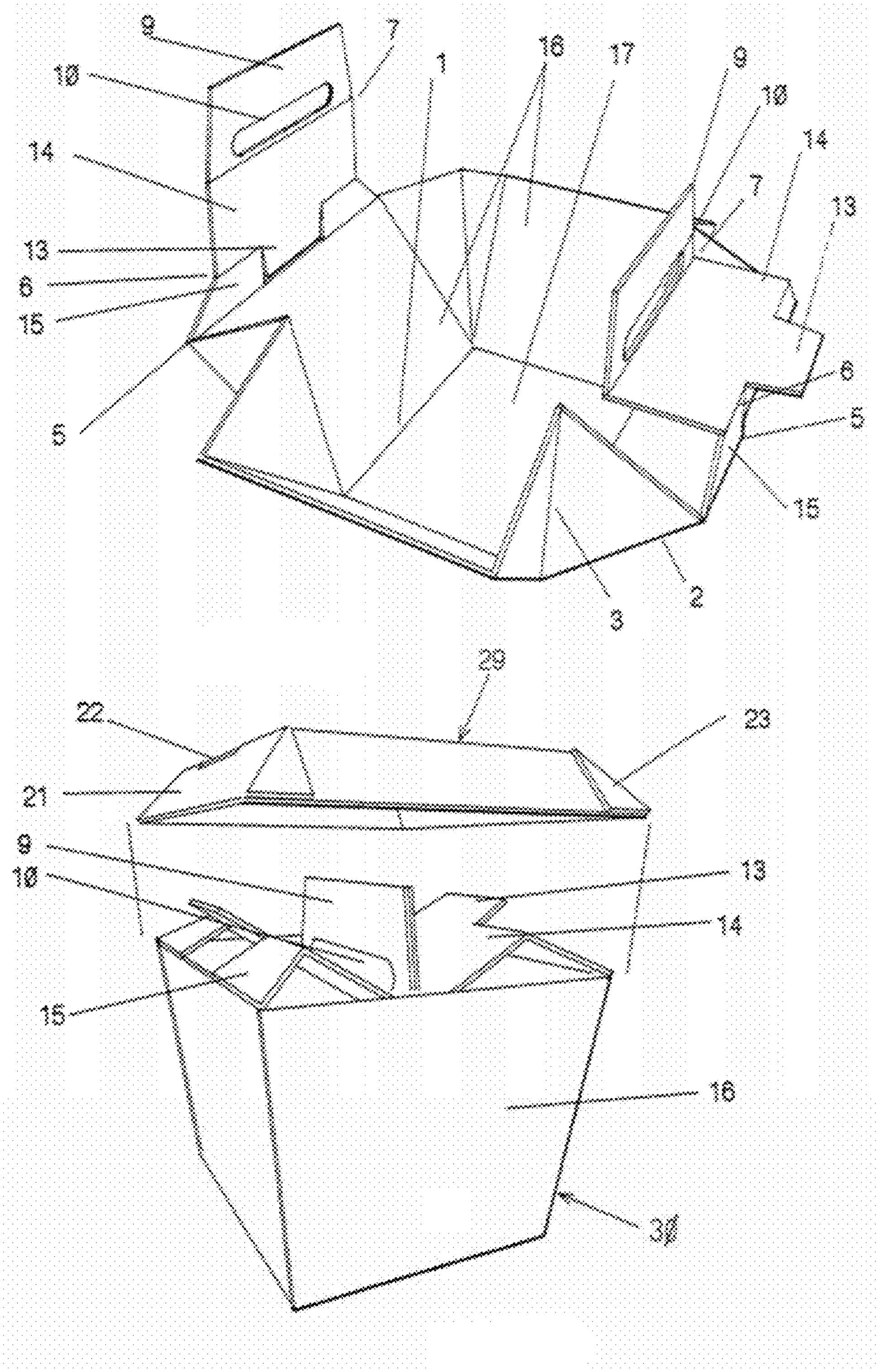
FIG. 1 PRIOR ART
FIG. 1 shows a prior container construct.
Figure 2:
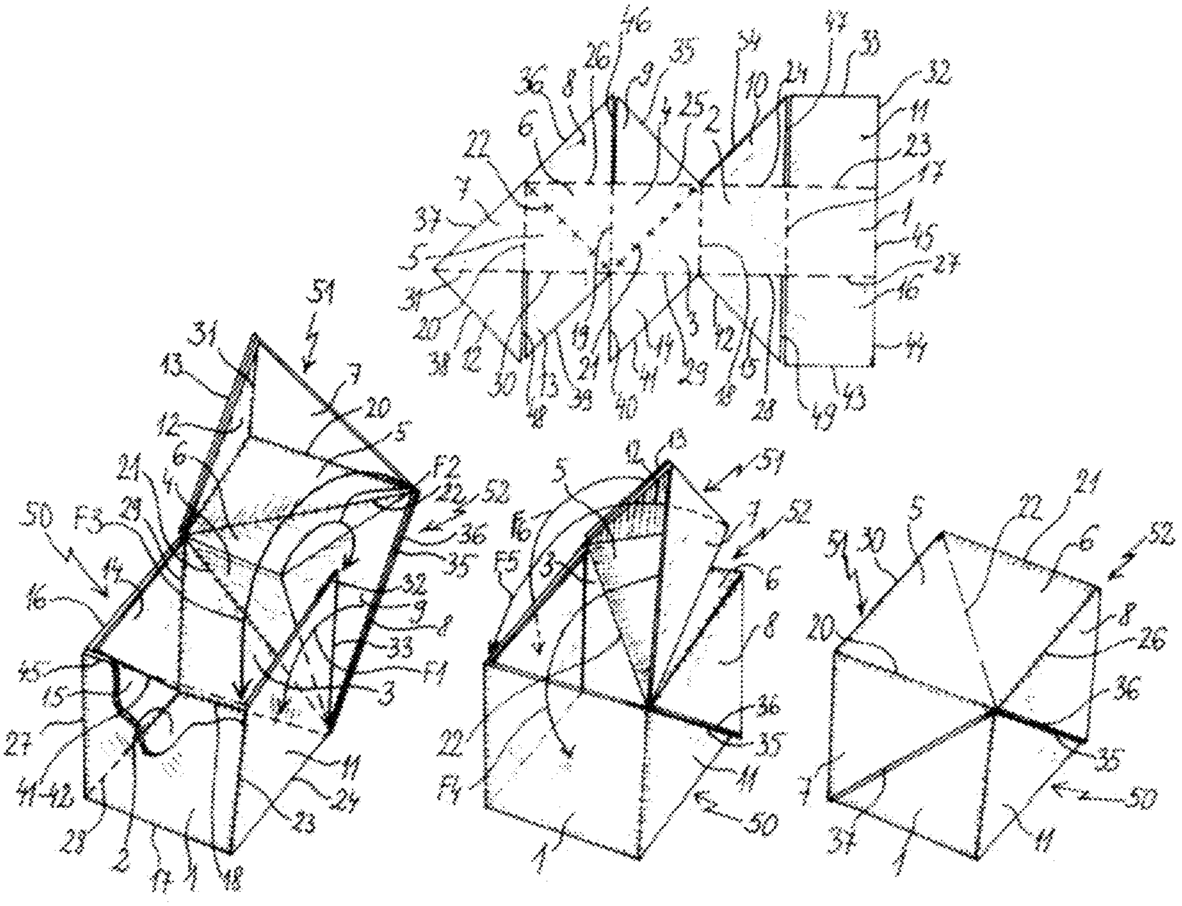
FIG. 2 PRIOR ART
FIG. 2 shows another container construct.
Figure 3:
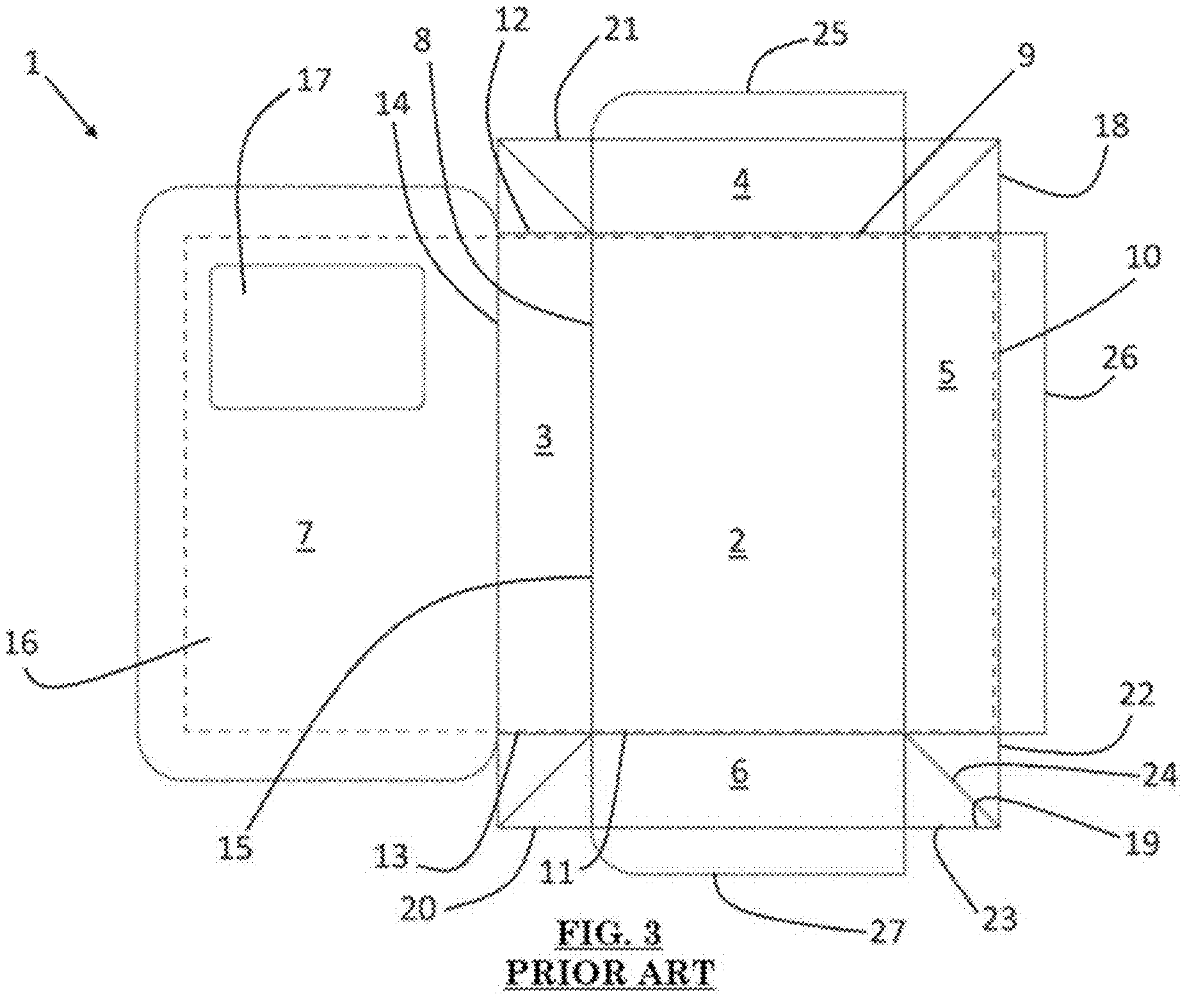
FIG. 3 PRIOR ART
FIG. 3 shows a further prior container.
Figure 4:
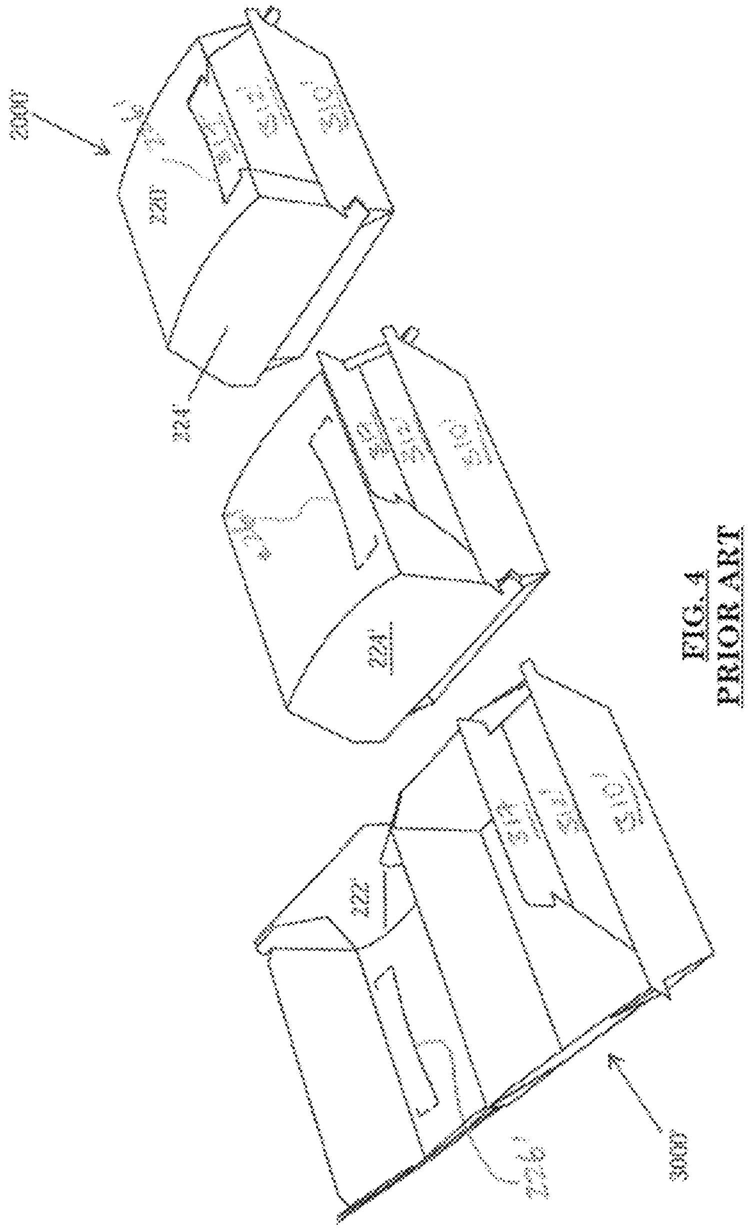
FIG. 4 PRIOR ART
FIG. 4 shows yet another container construct.
Figure 5:
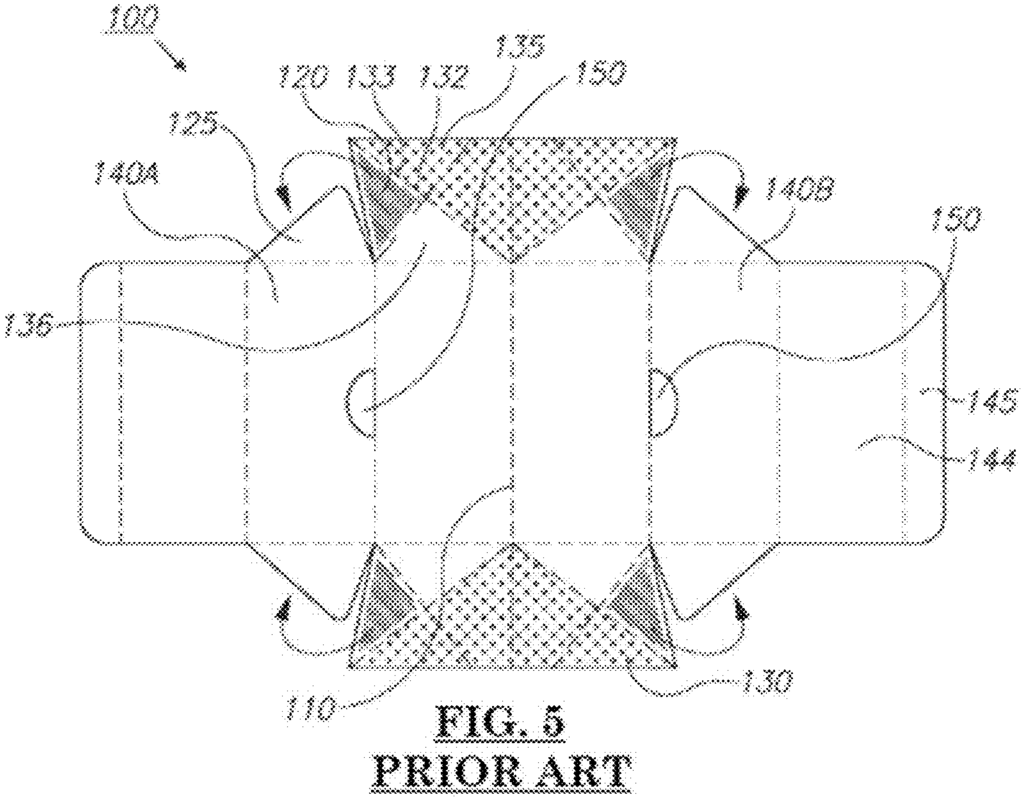
FIG. 5 PRIOR ART
FIG. 5 also shows a prior container construct.
Figure 6:
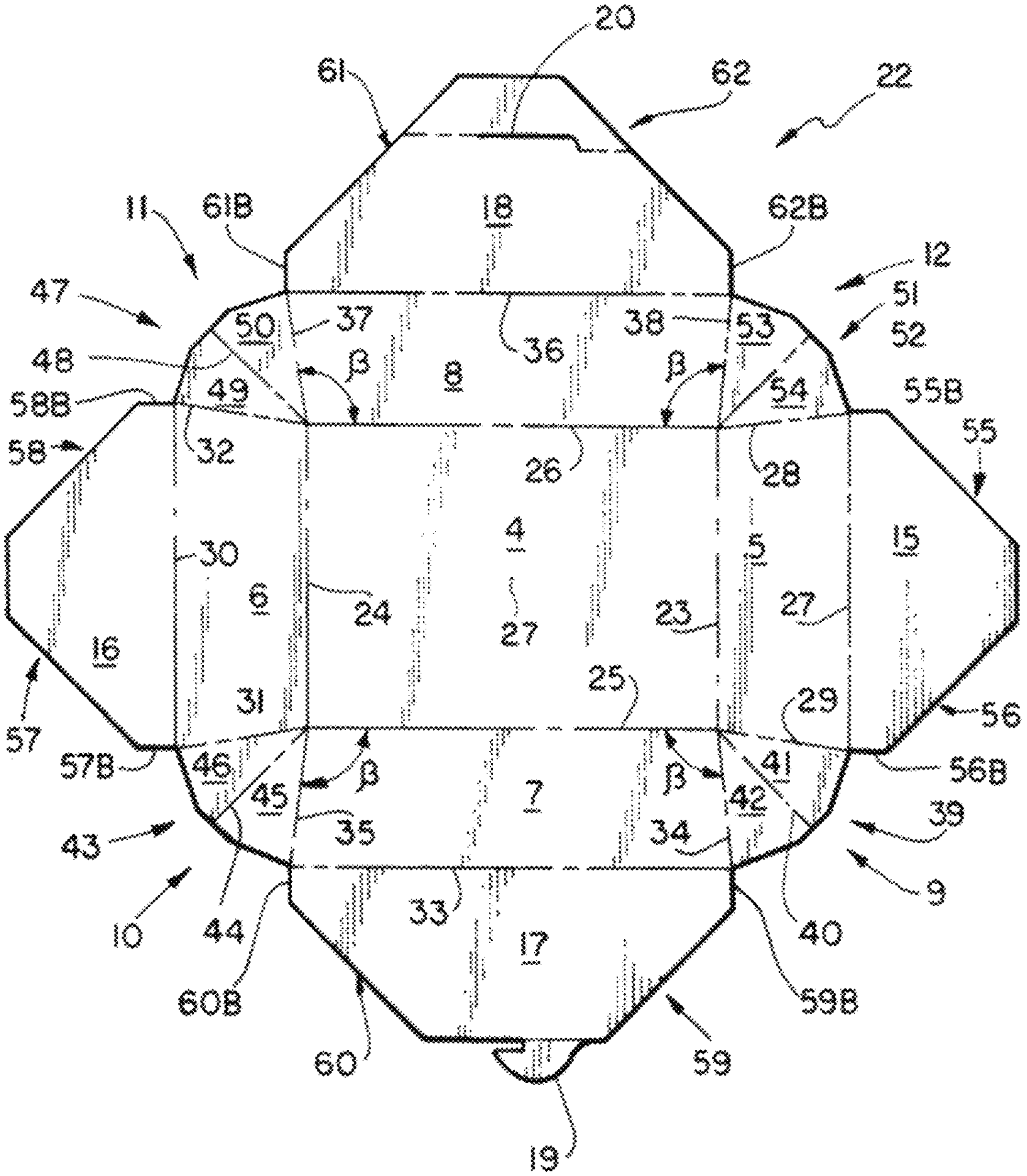
FIG. 6 PRIOR ART
FIG. 6 too shows a prior container construct.
Figure 7:
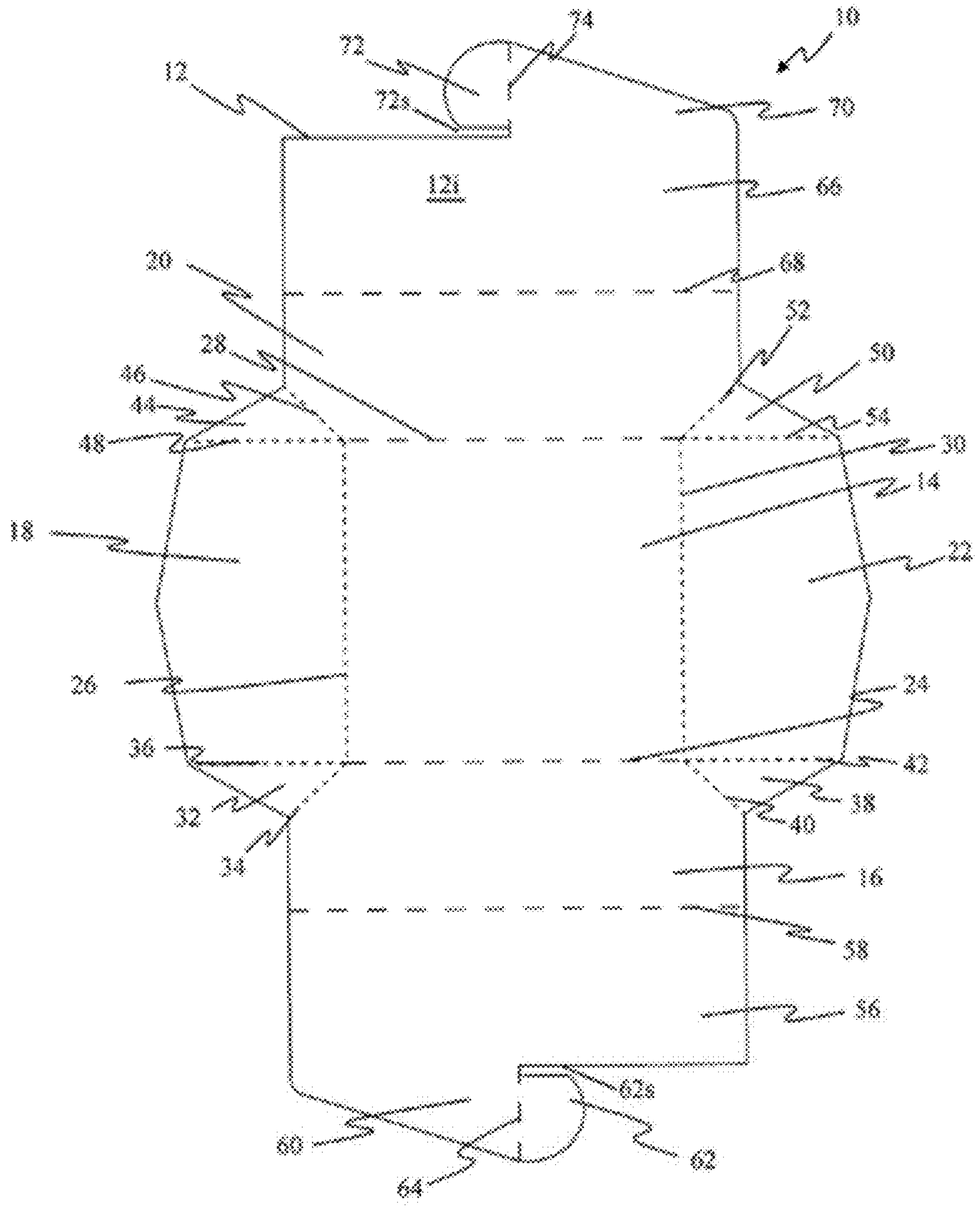
FIG. 7 PRIOR ART
FIG. 7 also shows yet another prior container construct.
Figure 8:
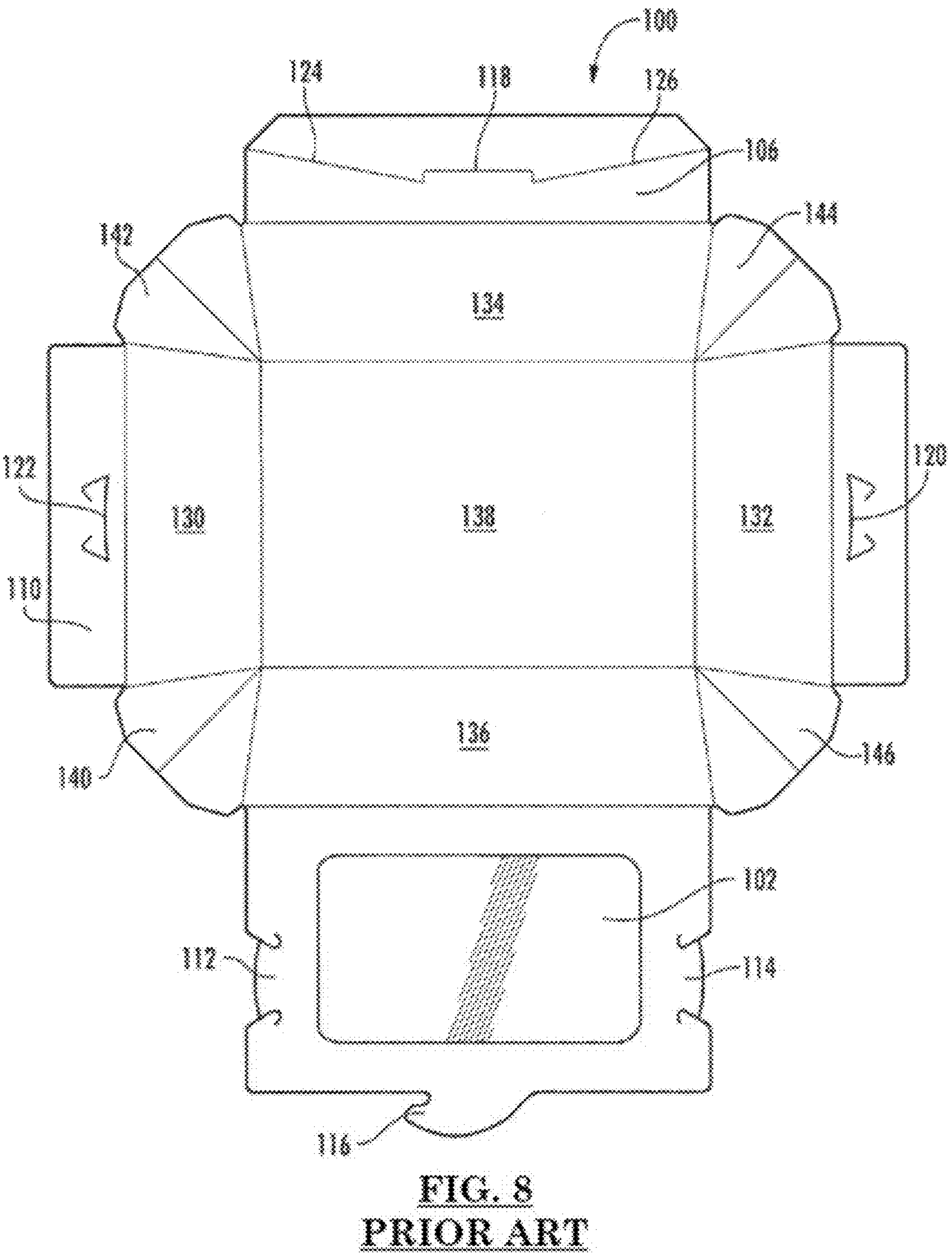
FIG. 8 PRIOR ART
FIG. 8 shows yet a further prior container construct.
Figure 9:
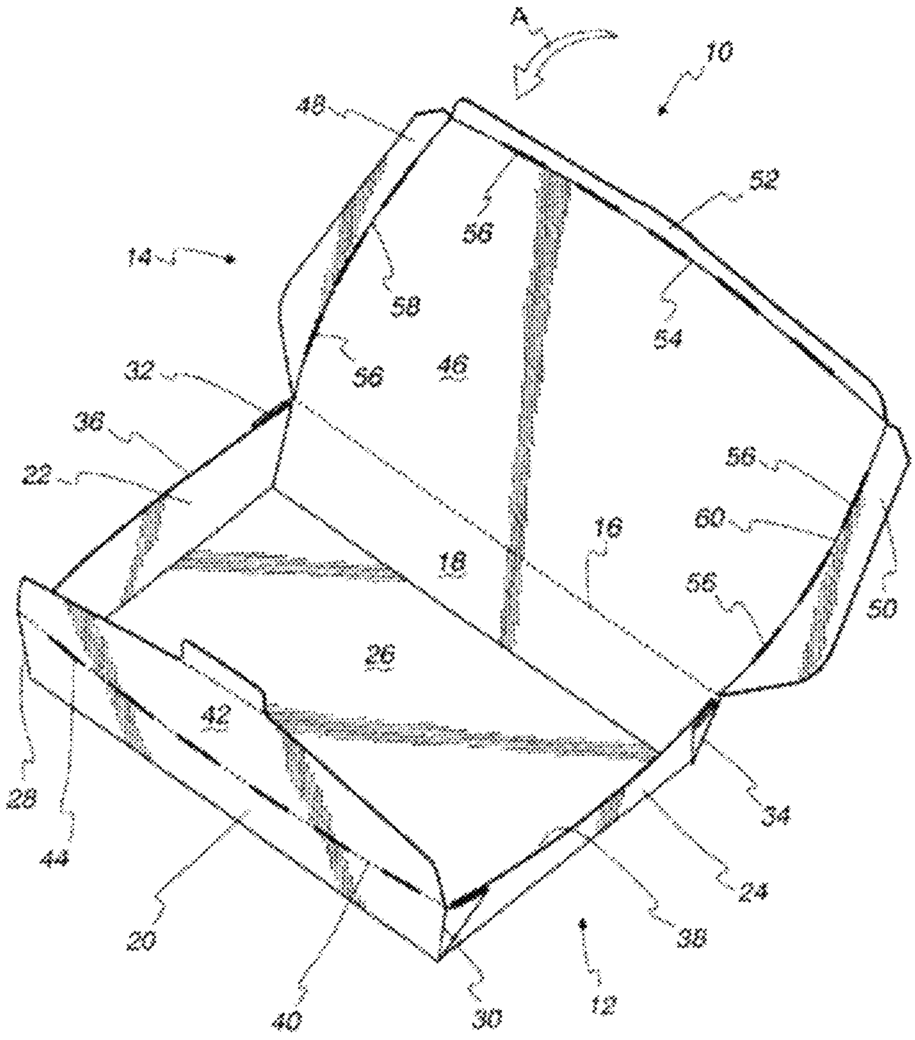
FIG. 9 PRIOR ART
FIG. 9 shows a further prior container construct.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase “x to y” includes the range from ‘x’ to ‘y’ as well as the range greater than ‘x’ and less than ‘y’. The range can also be expressed as an upper limit, e.g. ‘about x, y, z, or less’ and should be interpreted to include the specific ranges of ‘about x’, ‘about y’, and ‘about z’ as well as the ranges of ‘less than x’, less than y', and ‘less than z’. Likewise, the phrase ‘about x, y, z, or greater’ should be interpreted to include the specific ranges of ‘about x’, ‘about y’, and ‘about z’ as well as the ranges of ‘greater than x’, greater than y', and ‘greater than z’. In addition, the phrase “about ‘x’ to ‘y’”, where ‘x’ and ‘y’ are numerical values, includes “about ‘x’ to about ‘y’”.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as “about” that particular value in addition to the value itself. For example, if the value “10” is disclosed, then “about 10” is also disclosed. Ranges can be expressed herein as from “about” one particular value, and/or to “about” another particular value. Similarly, when values are expressed as approximations, by use of the antecedent “about,” it will be understood that the particular value forms a further aspect. For example, if the value “about 10” is disclosed, then “10” is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of “about 0.1% to 5%” should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, “about,” “approximately,” “substantially,” and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms “about,” “approximate,” “at or about,” and “substantially” can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is “about,” “approximate,” or “at or about” whether or not expressly stated to be such. It is understood that where “about,” “approximate,” or “at or about” is used before a quantitative value, the parameter also includes the specific quantitative value itself, unless specifically stated otherwise.

The term “optional” or “optionally” means that the subsequent described event, circumstance or substituent may or may not occur, and that the description includes instances where the event or circumstance occurs and instances where it does not.

As used herein, “tangible medium of expression” refers to a medium that is physically tangible or accessible and is not a mere abstract thought or an unrecorded spoken word. “Tangible medium of expression” includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to “one embodiment”, “an embodiment,” “an example embodiment,” means that a particular feature, structure or characteristic described in connection with the embodiment is included in at least one embodiment of the present disclosure. Thus, appearances of the phrases “in one embodiment,” “in an embodiment,” or “an example embodiment” in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the containers described herein can be presented as a combination kit. As used herein, the terms “combination kit” or “kit of parts” refers to the single sheet blanks, a package of more than one blank, and any additional components that are used to package, sell, market, deliver, and/or provide the combination of elements or a single element, such as the containers disclosed herein. Such additional components include, but are not limited to, packaging, blister packages, and the like. The separate kit components can be contained in a single package or in separate packages within the kit.

In some embodiments, the combination kit also includes instructions printed on or otherwise contained in a tangible medium of expression. The instructions can provide information regarding the content of the kit, safety information regarding the content of the kit, information regarding assembling and unassembling containers of the current disclosure. In some embodiments, the instructions can provide directions and protocols for constructing/deconstructing/treating containers disclosed herein including any of the methods described in greater detail elsewhere herein.

Figure 13:
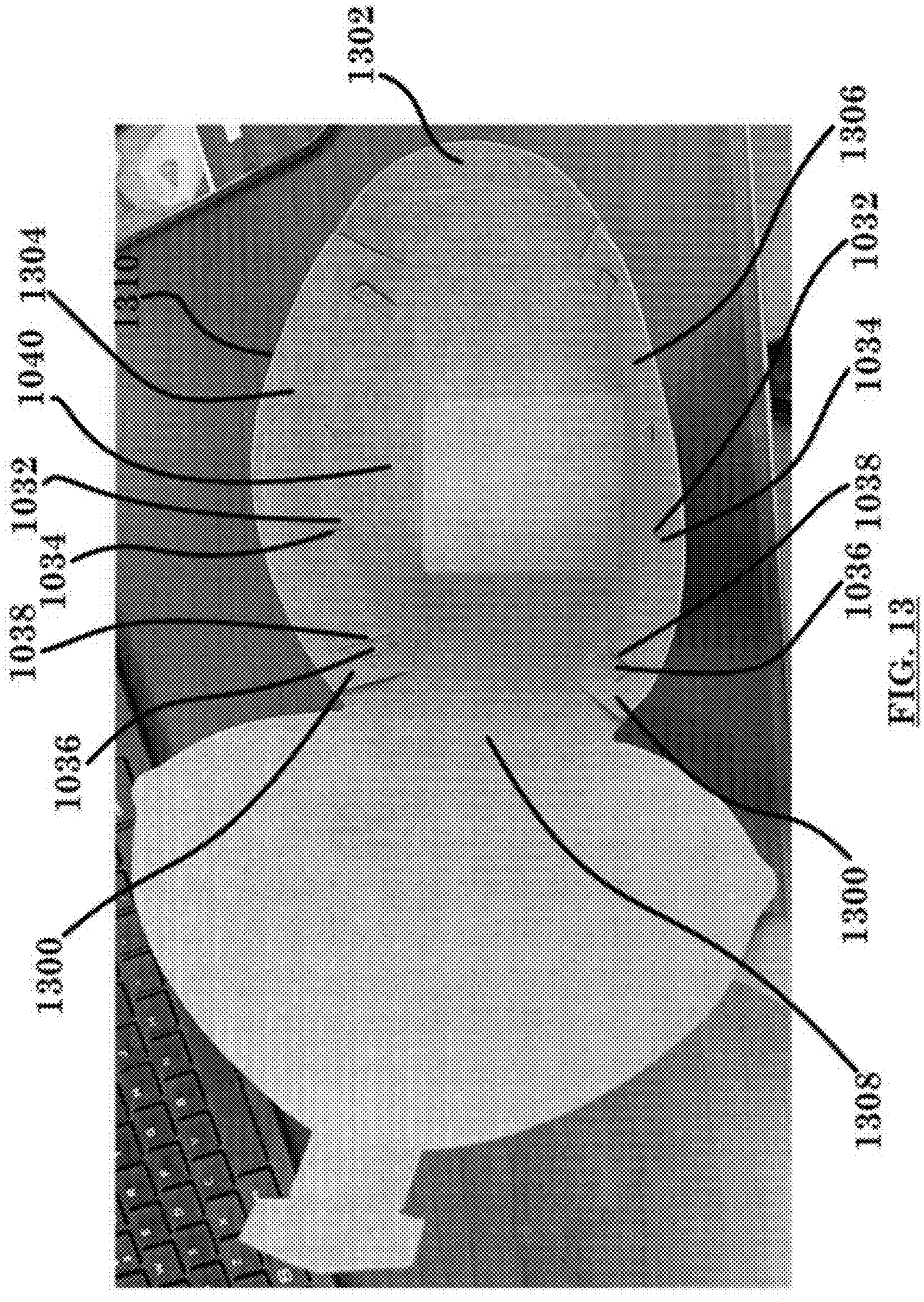
FIG. 13 shows a blank of the current disclosure with front, back and side walls assembled.
Figure 14:
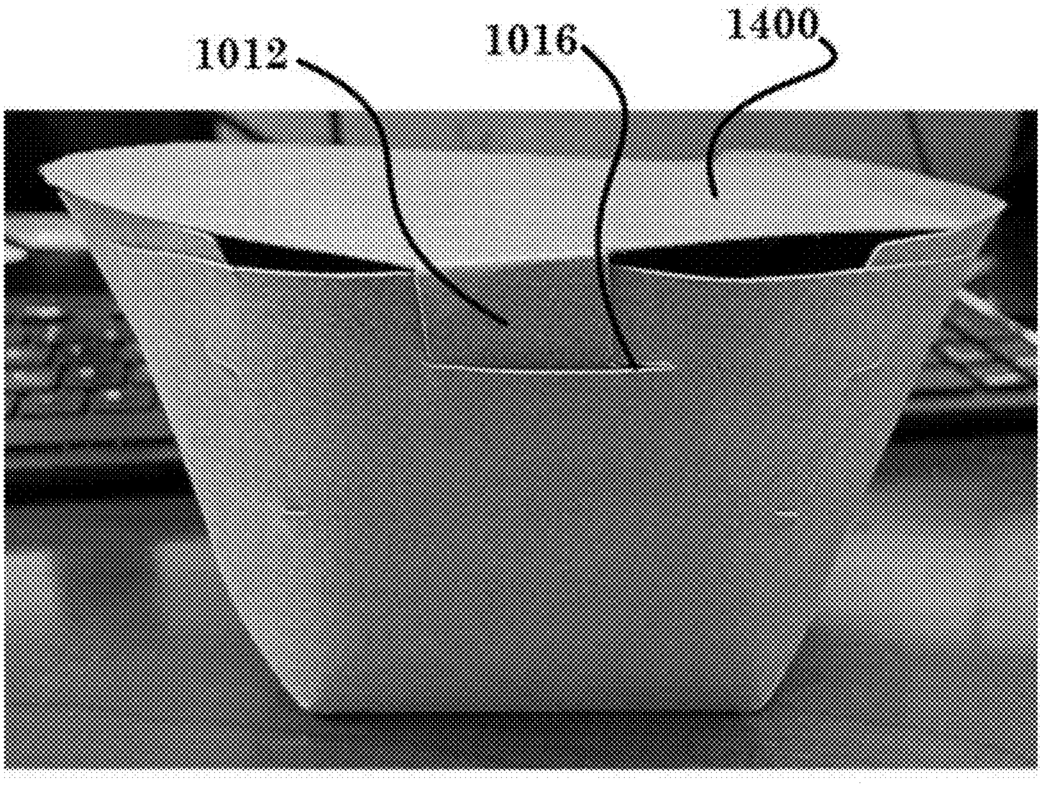
FIG. 14 shows a front view of an assembled blank of the current disclosure.
Figure 15:
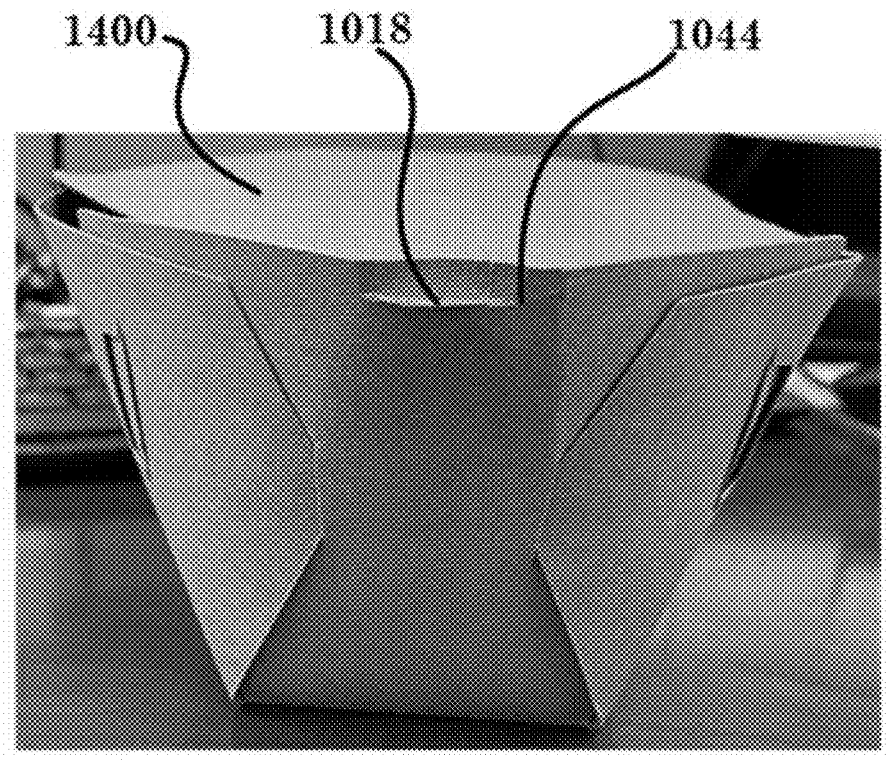
FIG. 15 shows a side view of an assembled blank of the current disclosure.

FIG. 1 shows a blank 1000 that may assemble a folding storage container, see FIGS. 13-15, of the current disclosure. Blank 1000 may include blank inner surface 1002, which may define blank front panel 1004, blank back panel 1005, blank first side panel 1006, blank second side panel 1008, blank lid 1010, blank bottom 1011, and blank closure tab 1012. Blank front panel 1004 may define a front wall of the containers disclosed herein and may include blank bottom hinges 1014, which may comprise a score in the material forming blank 1000, a preformed bend, or other means of allowing blank bottom hinge 1014 to allow blank front panel 1004 to hingedly pivot with respect to blank bottom hinge 1014 as known to those of skill in the art.

Blank front panel 1004 may also define lid closure tab slot 1016 that accepts blank closure tab 1012. While various numbers of tab slots and tab inserts are shown, the current disclosure is not so limited and more or less slots and inserts may be defined on blank lid 1010 and within front panel inner face 1020, such as 1, 2, 3, 4, 5, 6, etc., in order to provide less or additional securement for blank lid 1010 with respect to blank front panel 1004, blank first side 1006, and blank second side 1008. While the slots and tabs shown herein may show one possible configuration of their respective shapes, the current disclosure is not so limited. Slots may be straight, arcuate, angled, etc., as long as they are shaped to receive the tabs. Both slots and tabs on blank 1000 may be angled with respect to blank bottom 1011, blank front panel 1004, blank back panel 1005, blank first side 1006, and/or blank second side 1008. Angling of the slots allows for ease of insertion of the tabs into the slots and also allows for easier and faster construction of the container from blank 1000. In one embodiment, the placement of the slots and tabs may be 70-75% of the distance to the rim from the bottom of the structure measured from the nearest corner of the slots and tabs. Further, the spacing between the tabs and slots may be a factor of 3× based on the slot distance from the angled edge.

Blank front panel 1004 may also form front panel side flanges 1022 that define front panel insertion points 1024 as well as front panel tabs 1026. During assembly, one lifts blank front panel 1004 via bending blank front panel 1004 upward with respect to blank bottom 1011 along its adjacent blank bottom hinge 1014 while also bending blank first side 1006 and blank second side 1008 along their respective adjacent bottom hinges 1014 to bend the sides upward with respect to blank bottom 1011.

Figure 11:
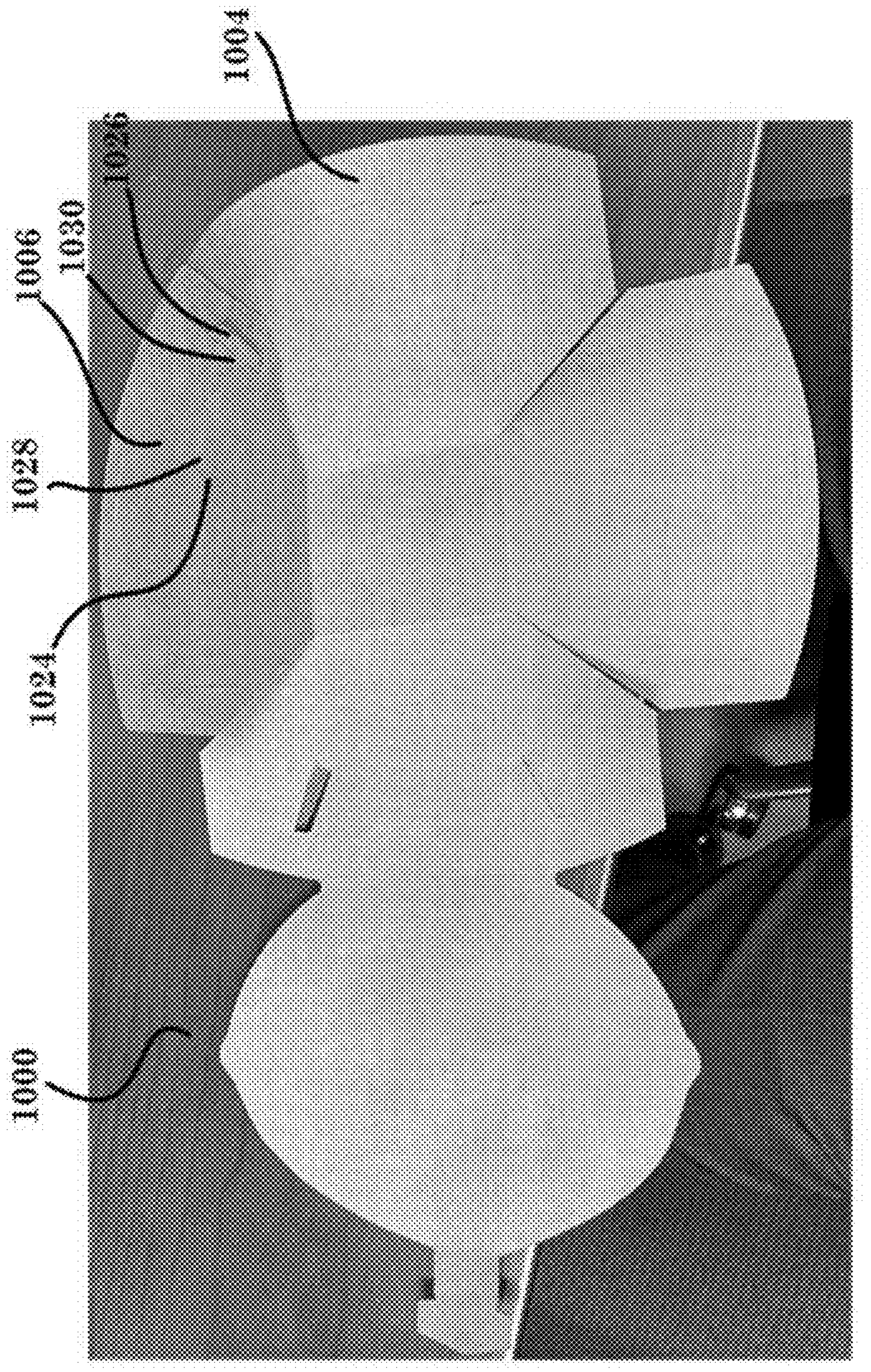
FIG. 11 shows beginning assembly of a blank of the current disclosure.
Figure 12:
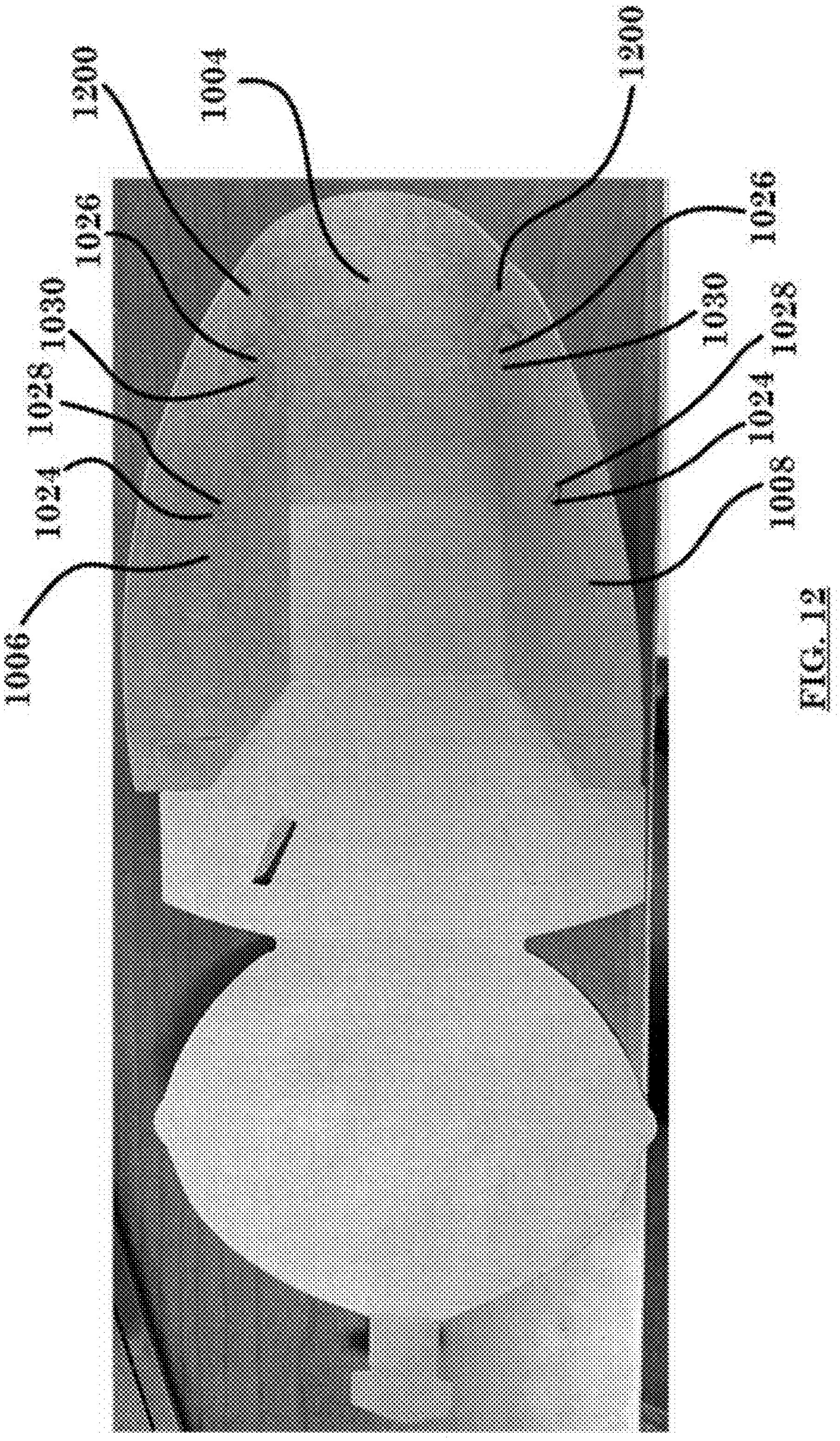
FIG. 12 shows further assembly of the walls and front of a blank of the current disclosure.

One then slides front panel insertion points 1024 under blank first side 1006 and blank second side 1008 and inserts insertion points 1024 into side panel first receiving slots 1028 and then introduces front panel tabs 1026 into front panel tab receiving slots 1030, see FIGS. 11 and 12 showing front panel 1004 joined to blank first side 1006 and blank second side 1008 sides assembled. Next, one bends blank back panel 1005 along its adjacent blank bottom hinge 1014, moving blank back panel upward with respect to blank bottom 1011, then slides back panel insertion points 1032 under blank first side 1006 and blank second side 1008 and into back panel insertion point receiving slots 1034. Then one affixes back panel tabs 1036 into side panel second receiving slots 1038. This completes formation of the "bowl", "cup", or container cavity 1040 of blank 1000, see FIG. 13.

To secure blank lid 1010, one bends blank lid along lid hinge 1042 to place blank lid 1010 essentially parallel to blank bottom 1011. To secure blank lid 1010, one inserts blank closure tab 1012 into lid closure tab slot 1016 to secure blank lid 1010 to front panel 1004 and then inserts lid side tab inserts 1018 into lid slide tab slots 1044 to secure the lid to blank first side 1006 and blank second side 1008.

FIG. 11 shows blank 1000 with blank front panel 1004 joined to blank first side 1006 via front panel tab 1026 inserted into front panel receiving slot 1030 as well as front panel insertion point 1024 protruding into container cavity 1040 after inserting through side panel first receiving slot 1028. FIG. 12 shows blank 1000 with blank front panel 1004 joined to blank first side 1006 and blank second side 1008 via front panel tabs 1026 inserted into front panel receiving slots 1030, as well as front panel insertion points 1024 protruding into container cavity 1040 after inserting through side panel first receiving slots 1028 on blank first side 1004 and blank second side 1006 creating front internal folds 1200 where blank first side 1006 and blank second side 1008 overlap blank front panel 1004.

FIG. 13 shows container cavity 1040 formed by connecting all four "walls" of blank 1000, blank front panel 1004, blank first side panel 1006, blank second side panel 1008, and blank back panel 1005. Blank back panel 1005 is affixed to blank first side panel 1004 and blank second side panel 1006 via inserting back panel insertion points 1032 into side panel second receiving slots 1034 and back panel tabs 1036 into back panel tab receiving slots 1038 to form rear panels 1300 wherein the side panels 1004 and 1006 overlap back panel 1005.

As FIG. 13 further shows, blank 1000, when assembled, may form multiple arcuate walls, such as front arcuate wall 1302, first side arcuate wall 1304, second side arcuate wall 1306, and back arcuate wall 1308. Further, first side arcuate wall 1304 and second side arcuate wall may both overlap front arcuate wall 1302 and back arcuate wall 1308. The overlapping nature and arched shape of the arcuate walls provide increased strength to perimeter 1310 as impacts will be distributed around perimeter 1310 instead of localized at the point of impact as occurs with prior constructs. While only four walls are shown, more or less arcuate walls, such as 2, 3, 5, 6, 7, 8, etc., may be formed in blank 1000.

Figure 10:
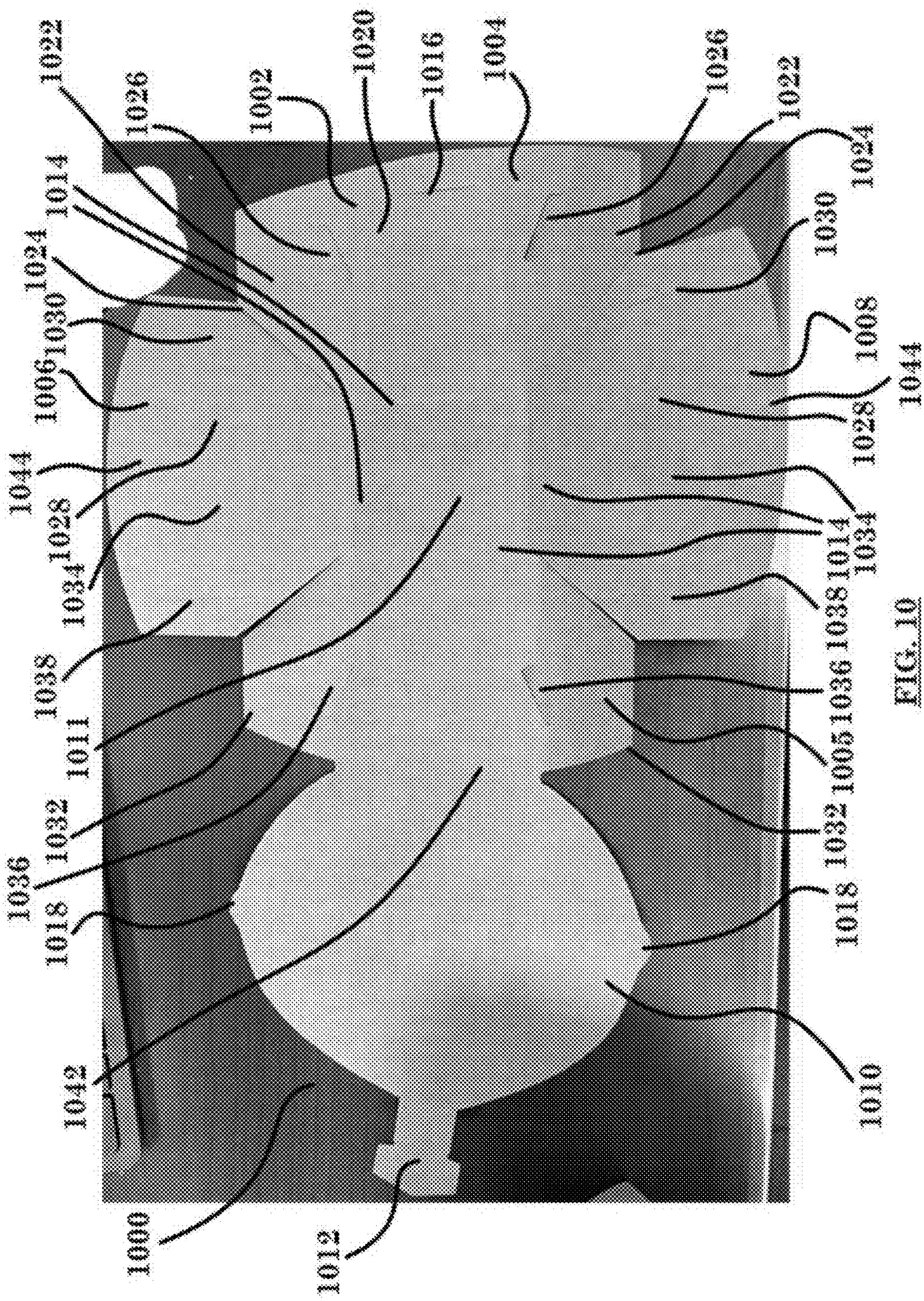
FIG. 10 shows one embodiment of a blank of the current disclosure.
Figure 16:
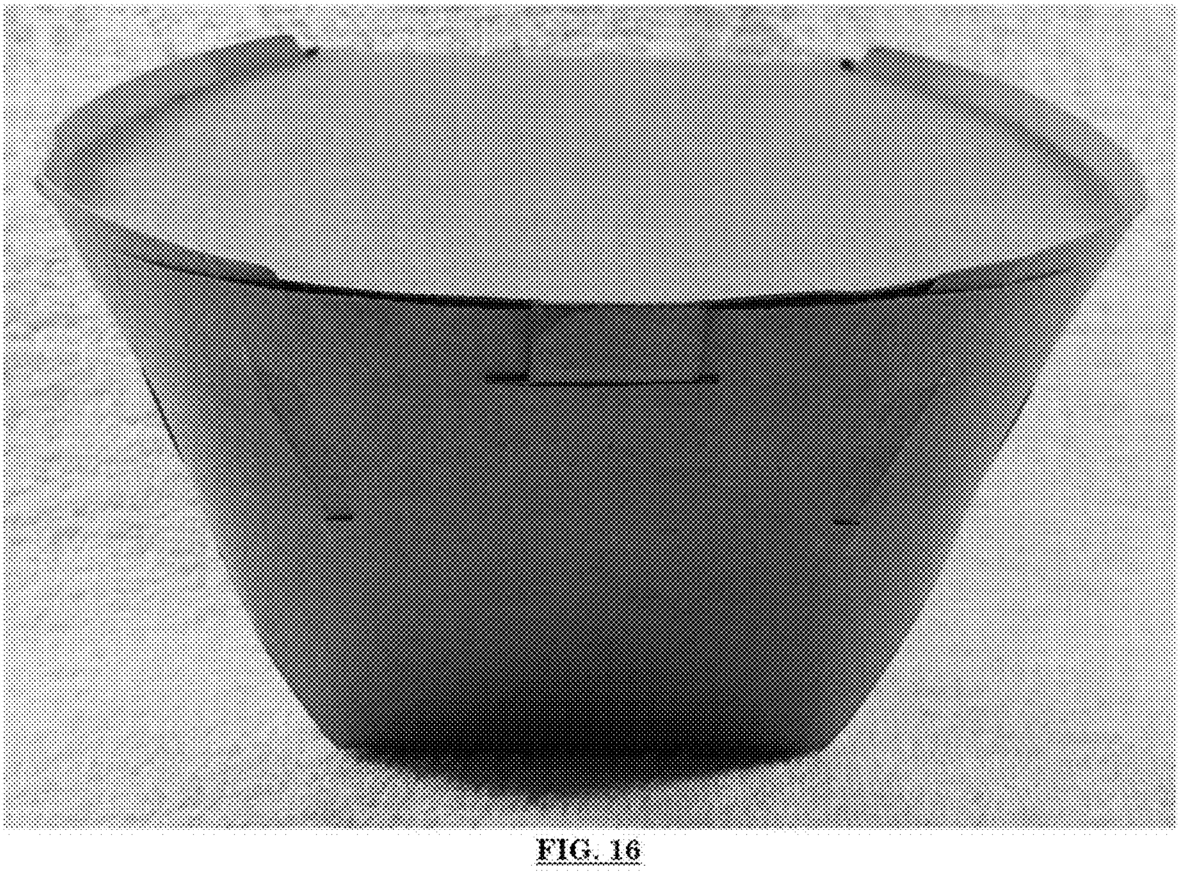
FIG. 16 shows an alternate view of the assembled blank shown in FIG. 15.
Figure 17:
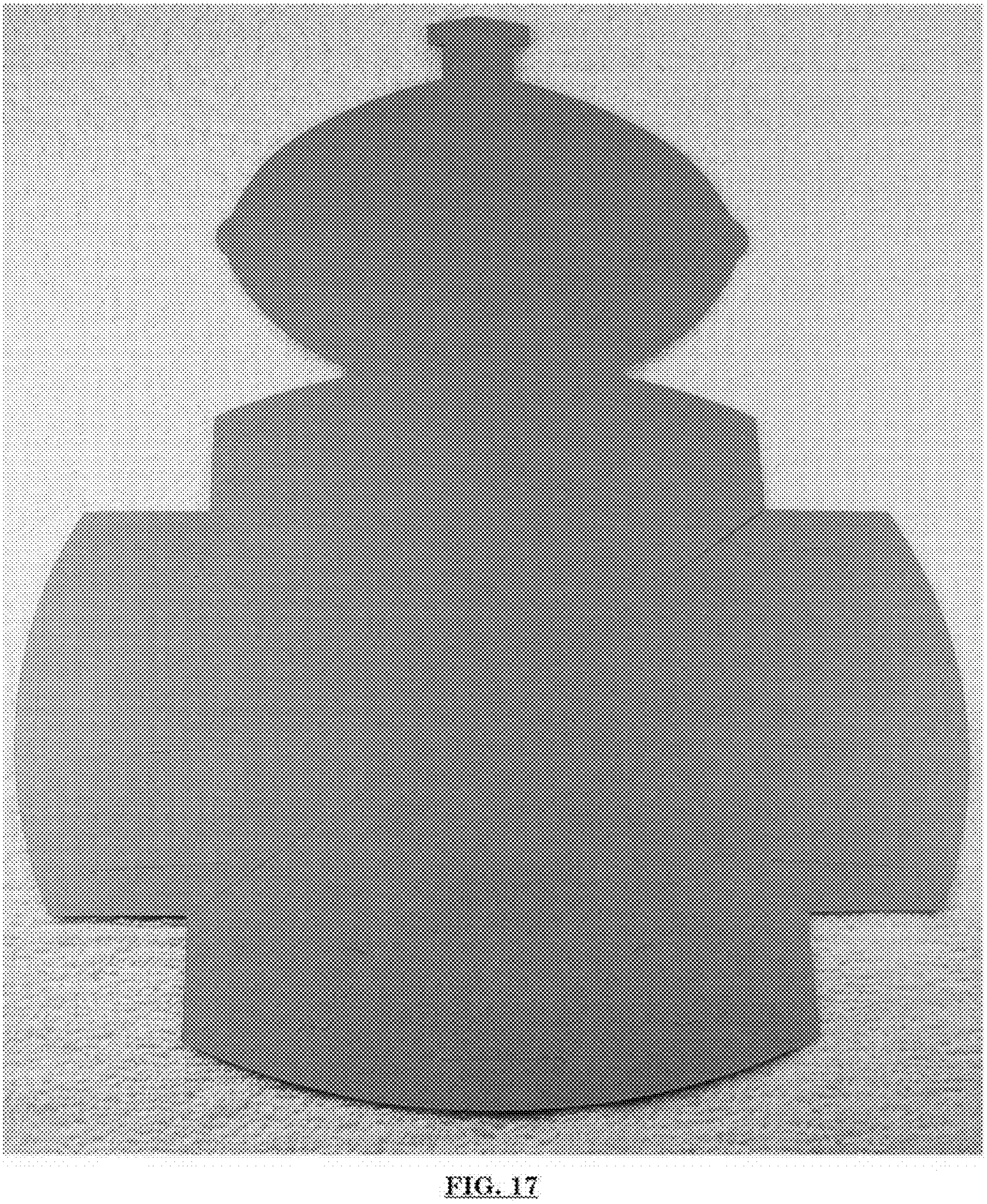
FIG. 17 shows an alternate view of the blank shown in FIG. 10.

FIG. 14 shows a front view of assembled blank 1400 with blank closure tab 1012 inserted into lid closure tab slot 1016. FIG. 15 shows a side view of assembled blank 1400 with lid side tab inserts 1018 inserted into lid side tab slots 1044. FIG. 16 shows an alternate view of the assembled blank shown in FIG. 15. FIG. 17 shows an alternate view of the blank shown in FIG. 10.

Blank 1000 may also be formed to be flexible. Prior constructions, especially those made from rigid materials, such as polystyrene, plastics, meltblowns, nonwovens, etc., may fissure or crack when being assembled given lack of flexibility in their component materials. Here, blank 1000, including blank inner surface 1002, blank front panel 1004, blank back panel 1005, blank first side 1006, blank second side 1008, and blank lid 1010 may be formed to be flexible to aide with assembly of the blank into a finished container. This flexibility also allows blank front panel 1004, blank back panel 1005, blank first side 1006, blank second side 1008 to form the arched or curved walls in the final construct.

This curved wall construction not only provides the strength of an arch to the walls of the container, but also specifically avoids the "blocky and angular" and, sometimes unaesthetically pleasing, appearance of prior constructions. The current disclosure provides not only a stronger container, but one that differentiates the shape of containers of the current disclosure from those of prior constructs. Indeed, by having horizontal arches forming at least some of the sides of the container, like the horizontal arches forming hydrostatic dams, the containers of the current disclosure may be formed to be less susceptible to "banging" damage when the container hits against an object while being transported. Indeed, the arch configuration, when assembled from the blank, can enable the structure to partially or fully "rebound" when struck, forming a stronger container than previous constructions, which maintains structural integrity in view of events that may damage, rupture, or crack prior containers. The construct also transfers received force along the walls via multiple walls forming interlocking arches.

In one embodiment, blank 1000 may be formed from cardboard, paperboard, fiberboards, nonwovens, polymers, synthetics, etc. In one embodiment, surface treatments may be applied to the material forming blank 1000. These may include a variety of chemical compositions and proprietary formulations including alkyl ketene dimer (AKD) size, coating lubricants, colloidal silica, fluorochemical products, humectants, inkjet printability aids, mordants, starch cross-linkers, styrene acrylic emulsions (SAE), styrene maleic anhydride (SMA), surface strength additives, and/or wax emulsions. Possible treatments for the current disclosure may include food industry treatments such as grease and oil resistance coatings, water resistance coatings, etc. Other coatings may include release coatings, heat seal coatings, vapor barrier coatings, etc.

In one instance, the blank may be created from either a computerized CNC sample cutting table or from a manufactured industrial cutting die that is either rotary or platen in form. A steel rule cuts the blank shape and all closure components and the steel rule also forms the crease and hinge components of the shape. The cutting die that forms the blank can either use a counter die or not. The specifics of the cutting die(s) are manufactured according to the type of substrate that is going to be formed. The forming action is produced by the substrate being squeezed between the cutting die rule and a high strength hard backing anvil or platen. The computerized CNC sample cutting table uses a digitized computer input file to produce the blank on the table. The table is equipped with cutting and creasing implements to physically produce the shape.

Various modifications and variations of the described methods, folding storage containers, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A folding storage container comprising:

a blank configured to fold into at least one storage container, the blank further comprising:

a blank inner surface defining at least;

a blank bottom connected to a blank front panel, a blank first side panel, a blank second side panel, and a blank back panel via at least one bottom hinge disposed between the blank bottom, the blank front panel, the blank first side panel, the blank second side panel, and the blank back panel, wherein the at least one bottom hinge is configured to allow each of the blank front panel, the blank first side panel, the blank second side panel, and the blank back panel to hingedly pivot with respect to the blank bottom;

a blank lid connected to the blank back panel via a blank lid hinge configured to allow the blank lid to hingedly pivot with respect to the blank back panel;

the blank lid further comprising a blank closure tab extending from the blank lid;

the blank front panel further comprising at least one front panel side flange, the at least one front panel side flange further defining at least one front panel insertion point;

the blank back panel further comprising at least one back panel side flange, the at least one back panel side flange defining at least one back panel insertion point;

the at least one front panel insertion point configured to slide under either the blank first side panel or the blank second side panel and engage at least one receiving slot on either the blank first side panel or the blank second side panel and the at least one back panel insertion point configured to slide under either the blank first side panel or the blank second side panel and engage at least one receiving slot on either the blank first side panel or the blank second side panel, wherein the at least one front panel insertion point is integrally formed as a part of the at least one front panel and the at least one back panel insertion point is integrally formed as a part of the at least one back panel such that the at least one front panel slides into the at least one receiving slot on either the blank first side panel or the blank second side panel and the at least one back panel slides into the at least one receiving slot on either the blank first side panel or the blank second side panel;

wherein the folding storage container forms substantially curved walls when assembled with the substantially curved walls configured to lay inside the at least one back panel and the at least one front panel and further configured to insert outward through an inner surface of the at least one back panel and the at least one front panel.

2. The folding storage container of claim 1, wherein the at least one bottom hinge comprises a score line or a preformed bend.

3. The folding storage container of claim 1, wherein the blank front panel defines at least one lid closure tab slot configured to engage the blank closure tab.

4. The folding storage container of claim 1, wherein the blank lid defines at least one lid side tab insert.

5. The folding storage container of claim 4, wherein the blank first side panel or the blank second side panel define at least one lid slide tab slot configured to engage the at least one lid side tab insert.

6. The folding container of claim 1, wherein the blank closure tab, the at least one back panel insertion point, or the at least one front panel insertion point comprises a slot.

7. The folding container of claim 6, wherein the slot comprising the blank closure tab, the slot comprising the at least one back panel insertion point, or the slot comprising the at least one front panel insertion point is angled with respect to the blank bottom.

8. A method for forming a folding storage container comprising: lifting a front panel and bending the front panel with respect to a blank bottom via bending at least one first hinge positioned between the front panel and the blank bottom;

bending a blank first side and a blank second side, via bending at least one first hinge affixed to the blank first side and at least one second hinge affixed to the blank second side, to bend the blank first side and the blank second side upward with respect to the blank bottom;

sliding at least one first front panel insertion point under the blank first side and sliding at least one second front panel insertion point under the blank second side;

inserting the at least one first front insertion point into a side panel first receiving slot and inserting the at least one second front panel insertion point into a side panel second receiving slot;

introducing at least one front panel into at least one front panel receiving slot, formed on either the blank first side or second side by sliding under either the blank first side or second side;

bending a back panel along its adjacent blank bottom hinge and moving the back panel upward with respect to the blank bottom;

sliding at least one first back panel insertion point under the blank first side and sliding at least one second back panel insertion point under the blank second side and then inserting the at least one first back panel insertion point into a first insertion point receiving slot and inserting the at least one second back panel insertion point into a second insertion point receiving slot;

affixing at least one first back panel into a first side panel second receiving slot and affixing at least one second back panel into a second side panel second receiving slot to form a container cavity;

wherein the at least one front panel insertion point is integrally formed as a part of the at least one front panel and the at least one back panel insertion point is integrally formed as a part of the at least one back panel such that the at least one front panel slides into the at least one receiving slot on either the blank first side panel or the blank second side panel and the at least one back panel slides into the at least one receiving slot on either the blank first side panel or the blank second side panel securing a blank lid via bending the blank lid along a lid hinge to place the blank lid essentially parallel to the blank bottom and inserting a blank closure tab, formed on the blank lid, into a lid closure tab slot, formed in the front panel, to secure the blank lid to the front panel;

inserting at least one first lid side tab, formed on the blank lid, into at least one first lid slide tab slot, formed into the blank first side, and inserting at least one second lid side tab, formed on the blank lid, into the at least one second lid slide tab slot, formed into the blank second side, to secure the blank lid to the blank first side and the blank second side; and wherein the folding storage container forms substantially curved walls when assembled.

9. The method for forming a folding storage container of claim 8, further comprising configuring the at least one first hinge and the at least one second hinge to comprise a score line or a preformed bend.

10. The method for forming a folding storage container of claim 8, further comprising configuring the lid closure tab slot, the side panel first receiving slot, the side panel second receiving slot, the first insertion point receiving slot, and the second insertion point receiving slot so their respective slots lay at an angle with respect to the blank bottom.

11. A method for making a folding storage container comprising: forming a blank configured to fold into at least one storage container, the blank configured to include:

a blank inner surface defining at least;

a blank bottom connected to a blank front panel, a blank first side panel, a blank second side panel, and a blank back panel via at least one bottom hinge disposed between the blank bottom, the blank front panel, the blank first side panel, the blank second side panel, and the blank back panel, wherein the at least one bottom hinge is configured to allow each of the blank front panel, the blank first side panel, the blank second side panel, and the blank back panel to hingedly pivot with respect to the blank bottom;

a blank lid connected to the blank back panel via a blank lid hinge configured to allow the blank lid to hingedly pivot with respect to the blank back panel;

the blank lid further comprising a blank closure tab extending from the blank lid;

the blank front panel further comprising at least one front panel side flange, the at least one front panel side flange further defining at least one front panel insertion point;

the blank back panel further comprising at least one back panel side flange, the at least one back panel side flange defining at least one back panel insertion point;

the at least one front panel insertion point configured to slide under either the blank first side panel or the blank second side panel and engage at least one receiving slot on either the blank first side panel or the blank second side panel and the at least one back panel insertion point configured to slide under either the blank first side panel or the blank second side panel and engage at least one receiving slot on either the blank first side panel or the blank second side panel;

wherein the at least one front panel insertion point is integrally formed as a part of the at least one front panel and the at least one back panel insertion point is integrally formed as a part of the at least one back panel such that the at least one front panel slides into the at least one receiving slot on either the blank first side panel or the blank second side panel and the at least one back panel slides into the at least one receiving slot on either the blank first side panel or the blank second side panel; and wherein the folding storage container forms substantially curved walls when assembled.

12. The method for making a folding storage container of claim 11, further comprising forming the at least one bottom hinge to comprise a score line or a preformed bend.

13. The method for making a folding storage container of claim 11, further comprising configuring the blank front panel to define at least one lid closure tab slot configured to engage the blank closure tab.

14. The method for making a folding storage container of claim 11, further comprising configuring the blank lid to define at least one lid side tab insert.

15. The method for making a folding storage container of claim 11, further comprising configuring the blank first side panel or the blank second side panel to define at least one lid slide tab insertion point configured to engage the at least one lid side tab insert.

16. The method for making a folding storage container of claim 11, further comprising configuring the at least one blank closure tab, the at least one back panel insertion point, or the at least one front panel insertion point comprises a slot.

17. The method for making a folding storage container of claim 16, further comprising configuring orientation of the slot comprising the blank closure tab, the slot comprising the at least one back panel insertion point, or the slot comprising the at least one front panel insertion point to be angled with respect to the blank bottom.

* * * * *